(12) United States Patent
Ito et al.

(10) Patent No.: US 10,926,719 B2
(45) Date of Patent: Feb. 23, 2021

(54) POWER SUPPLY TRUNK LINE ROUTING STRUCTURE FOR VEHICLE AND VEHICLE

(71) Applicant: TOYOTA JIDOSHA KABUSHIKI KAISHA, Toyota (JP)

(72) Inventors: Jiro Ito, Toyota (JP); Hiroki Kawakami, Okazaki (JP); Shinji Oshita, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/566,438

(22) Filed: Sep. 10, 2019

(65) Prior Publication Data

US 2020/0156567 A1 May 21, 2020

(30) Foreign Application Priority Data

Nov. 19, 2018 (JP) .................. 2018-216431

(51) Int. Cl.
*B60R 16/033* (2006.01)
*B60R 16/02* (2006.01)
*H01B 9/00* (2006.01)
*H01B 13/012* (2006.01)

(52) U.S. Cl.
CPC ........ *B60R 16/0215* (2013.01); *B60R 16/033* (2013.01); *H01B 9/003* (2013.01); *H01B 13/01254* (2013.01)

(58) Field of Classification Search
CPC ..... B60R 16/0215; B60R 16/033; H01B 9/03; H01B 13/01254

USPC ........................................ 174/72 A
See application file for complete search history.

(56) References Cited

U.S. PATENT DOCUMENTS

| | | | | |
|---|---|---|---|---|
| 3,627,903 A | * | 12/1971 | Plummer | H01B 7/0045 174/72 A |
| 5,324,203 A | * | 6/1994 | Sano | B60K 37/00 439/34 |
| 5,623,169 A | * | 4/1997 | Sugimoto | B60R 16/0207 307/10.1 |
| 5,675,189 A | * | 10/1997 | Anma | B60R 16/0315 307/9.1 |
| 5,808,371 A | * | 9/1998 | Kon'i | B60G 17/0185 307/10.1 |
| 5,818,673 A | * | 10/1998 | Matsumaru | H02J 9/06 361/63 |

(Continued)

FOREIGN PATENT DOCUMENTS

| EP | 0507225 A1 | 10/1992 |
|---|---|---|
| JP | H10-084629 | 3/1998 |

(Continued)

*Primary Examiner* — Timothy J Thompson
*Assistant Examiner* — Michael F McAllister
(74) *Attorney, Agent, or Firm* — Oliff PLC

(57) ABSTRACT

A power supply trunk line routing structure for a vehicle includes a first power supply trunk line extending in a vehicle front and rear direction along a right-side part of the vehicle in a vehicle width direction, a second power supply trunk line extending in the vehicle front and rear direction at a left-side part of the vehicle in the vehicle width direction, and a third power supply trunk line connected to a predetermined power supply device and connecting the first power supply trunk line and the second power supply trunk line at a front part of the vehicle.

10 Claims, 3 Drawing Sheets

(56) References Cited

U.S. PATENT DOCUMENTS

| | | | | |
|---|---|---|---|---|
| 5,917,249 | A * | 6/1999 | Kon'i | B60G 17/0195 307/10.1 |
| 6,127,741 | A * | 10/2000 | Matsuda | H02J 1/08 307/36 |
| 6,203,343 | B1 * | 3/2001 | Chevassus-More et al. | B60R 16/0207 174/72 B |
| 6,528,899 | B1 * | 3/2003 | Saito | H02J 1/14 307/10.1 |
| 6,600,236 | B2 * | 7/2003 | Rhodes | B60R 16/0207 116/200 |
| 6,791,207 | B2 * | 9/2004 | Yoshida | B60R 16/0315 307/10.1 |
| 7,561,445 | B2 * | 7/2009 | Yajima | B60K 6/445 174/72 A |
| 9,676,352 | B2 * | 6/2017 | Katano | B60R 16/033 |
| 2002/0111048 | A1 * | 8/2002 | Kondoh | B60R 16/0207 439/34 |
| 2003/0001434 | A1 * | 1/2003 | Saito et al. | B06G 17/0185 307/10.1 |
| 2003/0075980 | A1 * | 4/2003 | Yoshida | B60R 16/0315 307/9.1 |
| 2003/0085618 | A1 * | 5/2003 | Rhodes | B60R 16/0207 307/10.1 |
| 2004/0227402 | A1 | 11/2004 | Fehr et al. | |
| 2016/0039367 | A1 * | 2/2016 | Yoshida | B60R 16/0215 174/70 R |
| 2018/0029541 | A1 | 2/2018 | Shimizu et al. | |
| 2018/0029542 | A1 | 2/2018 | Yamada et al. | |
| 2018/0326926 | A1 | 11/2018 | Osada et al. | |
| 2018/0334113 | A1 | 11/2018 | Saito et al. | |

FOREIGN PATENT DOCUMENTS

| | | |
|---|---|---|
| JP | 2004-203385 A | 7/2004 |
| JP | 2017-136926 A | 8/2017 |
| JP | 2017-185996 A | 10/2017 |

* cited by examiner

POWER SUPPLY TRUNK LINE ROUTING STRUCTURE FOR VEHICLE AND VEHICLE

INCORPORATION BY REFERENCE

The disclosure of Japanese Patent Application No. 2018-216431 filed on Nov. 19, 2018 including the specification, drawings and abstract is incorporated herein by reference in its entirety.

BACKGROUND

1. Technical Field

The disclosure relates to a power supply trunk line routing structure for a vehicle and a vehicle.

2. Description of Related Art

In a vehicle, power needs to be appropriately supplied from a power supply unit, such as an alternator (generator) and a battery, to many in-vehicle devices. In general, a power supply unit and each in-vehicle device are connected by wire harnesses (W/H) that are aggregates of a large number of wires, and power is supplied. However, in recent years, the number of in-vehicle devices tends to increase, and a routing structure of power supply lines or communication lines in a vehicle has become complex.

For this reason, a trunk line structure and a branching structure for simplifying a routing structure of power supply lines or communication lines in a vehicle have been suggested in Japanese Unexamined Patent Application Publication No. 2017-185996 (JP 2017-185996 A). JP 2017-185996 A employs a routing structure for supplying power to in-vehicle devices, such as electronic control units (ECUs) and actuators (ACTs). In the routing structure, a single power supply trunk line is routed through a center portion of a vehicle, and a plurality of branch lines is branched off from the power supply trunk line.

SUMMARY

To route a power supply trunk line through a center portion of a vehicle as in the case of the above-described routing structure, a worker needs to enter into the vehicle and then assemble wire harnesses including a power supply trunk line. Therefore, assembly of wire harnesses at the time of manufacture of a vehicle is not easy. When a power supply trunk line routed through a center portion of a vehicle is checked or replaced, work similar to the above is required, so serviceability is not high.

With a routing structure in which a single power supply trunk line is routed through a center portion of a vehicle, if the power supply trunk line fails, electric power is not supplied to in-vehicle devices that are connected to the power supply trunk line at positions downstream of the failed point when viewed from a power supply device that serves as a power supply source. Thus, the functions of the in-vehicle devices to which no electric power is supplied stop.

The disclosure provides a power supply trunk line routing structure for a vehicle with improved ease of assembly and serviceability of wire harnesses including a power supply trunk line. The disclosure also provides a power supply trunk line routing structure for a vehicle, which, even when there occurs a failure at any point in a power supply trunk line, is able to continuously supply electric power to in-vehicle devices connected downstream of the failed point.

A first aspect of the disclosure provides a power supply trunk line routing structure for a vehicle. The power supply trunk line routing structure includes a first power supply trunk line extending in a vehicle front and rear direction along a right-side part of the vehicle in a vehicle width direction, a second power supply trunk line extending in the vehicle front and rear direction at a left-side part of the vehicle in the vehicle width direction, and a third power supply trunk line connected to a predetermined power supply device and connecting the first power supply trunk line and the second power supply trunk line at a front part of the vehicle.

The power supply trunk line routing structure of the first aspect is such a structure that the first power supply trunk line is disposed at the right-side part of the vehicle and the second power supply trunk line is disposed at the left-side part of the vehicle. Therefore, wire harnesses including the power supply trunk lines can be easily attached or detached from outside the vehicle. With this configuration, a worker need not enter into the vehicle to assemble, check, or replace wire harnesses, so ease of assembly and serviceability of wire harnesses are improved. In the power supply trunk line routing structure of the above aspect, physically redundant power supply paths are provided by the first power supply trunk line and the second power supply trunk line. With this configuration, even when any one of the power supply trunk lines fails, electric power can be continuously supplied from the remaining one of the power supply trunk lines to in-vehicle devices connected downstream of the failed point.

In the first aspect, the first power supply trunk line may connect a first power supply branch portion and a second power supply branch portion, the first power supply branch portion may be disposed at a vehicle front right part that is the front part of the vehicle at the right-side part in the vehicle width direction with respect to a center line extending in the vehicle front and rear direction through a center of the vehicle, the second power supply branch portion may be disposed at a vehicle rear right part that is a rear part of the vehicle at the right-side part in the vehicle width direction with respect to the center line. The second power supply trunk line may connect a third power supply branch portion and a fourth power supply branch portion, the third power supply branch portion may be disposed at a vehicle front left part that is the front part of the vehicle at the left-side part in the vehicle width direction with respect to the center line, the fourth power supply branch portion may be disposed at a vehicle rear left part that is the rear part of the vehicle at the left-side part in the vehicle width direction with respect to the center line.

In the above aspect, the second power supply branch portion and the fourth power supply branch portion may be connected by a fourth power supply trunk line.

In the above aspect, the first power supply branch portion may be configured to branch supply power from a power supply placed inside an instrument panel in which a meter or a warning lamp is disposed.

In the above aspect, the second power supply branch portion may be configured to branch supply power from a power supply placed inside a luggage compartment that is a space formed at a rear part of the vehicle to mainly load luggage.

In the above aspect, the third power supply branch portion may be configured to branch supply power from a power supply placed inside an instrument panel in which a meter or a warning lamp is disposed.

In the above aspect, the fourth power supply branch portion may be configured to branch suppled power from a power supply placed inside a luggage compartment that is a space formed at a rear part of the vehicle to mainly load luggage.

In the above aspect, each of the first power supply trunk line and the second power supply trunk line may include a flat strip-shaped flat wiring material extending in a straight line and using a steel material at least partially having an electrically conductive property.

In the above aspect, each of the first power supply trunk line and the second power supply trunk line may further include a flexible wire; and the wire may be attachable to a vehicle body when bent along a shape of the vehicle body.

A second aspect of the disclosure provides a vehicle comprising the power supply trunk line routing structure according to the above aspect.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Embodiment

Figure 1:
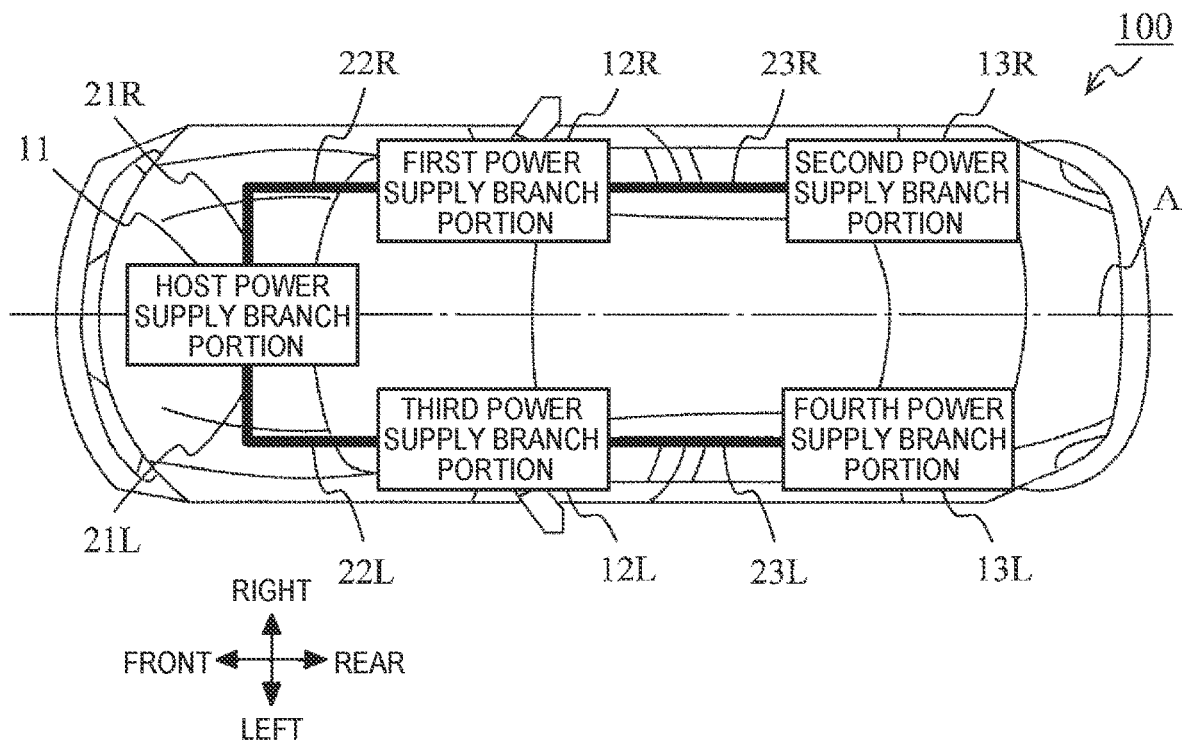
FIG. 1 is a plan view of a vehicle that includes a power supply trunk line routing structure according to an embodiment.

In a power supply trunk line routing structure according to an embodiment of the disclosure, a power supply trunk line is disposed on each of right and left sides in a vehicle width direction, and physically redundant power supply paths are provided. With this configuration, wire harnesses including power supply trunk lines can be easily attached or detached from outside a vehicle without entering into the vehicle. Therefore, ease of assembly of wire harnesses and serviceability of checking or replacement of wire harnesses are improved. Even when any one of the power supply trunk lines fails, electric power can be continuously supplied from the remaining one of the power supply trunk lines to in-vehicle devices connected downstream of the failed point.

Hereinafter, a vehicle that includes the power supply trunk line routing structure according to the embodiment of the disclosure will be described in detail with reference to the accompanying drawings. In the drawings, the arrow "front" indicates a front side in a vehicle front and rear direction, the arrow "rear" indicates a rear side in the vehicle front and rear direction, the arrow "right" indicates a right side in the vehicle width direction, and the arrow "left" indicates a left side in the vehicle width direction.

Structure

FIG. 1 is a plan view of a vehicle that includes a power supply trunk line routing structure 100 according to one embodiment of the disclosure when the vehicle is viewed from above with part of a vehicle body, such as a roof, seen through. The power supply trunk line routing structure 100 according to the present embodiment shown in FIG. 1 includes a plurality of power supply branch portions 11, 12R, 12L, 13R, 13L and a plurality of power supply trunk lines 21R, 21L, 22R, 22L, 23R, 23L. In the example of FIG. 1, the configuration in which the vehicle includes the five power supply branch portions is shown; however, the number of power supply branch portions is not limited thereto.

Figure 6:
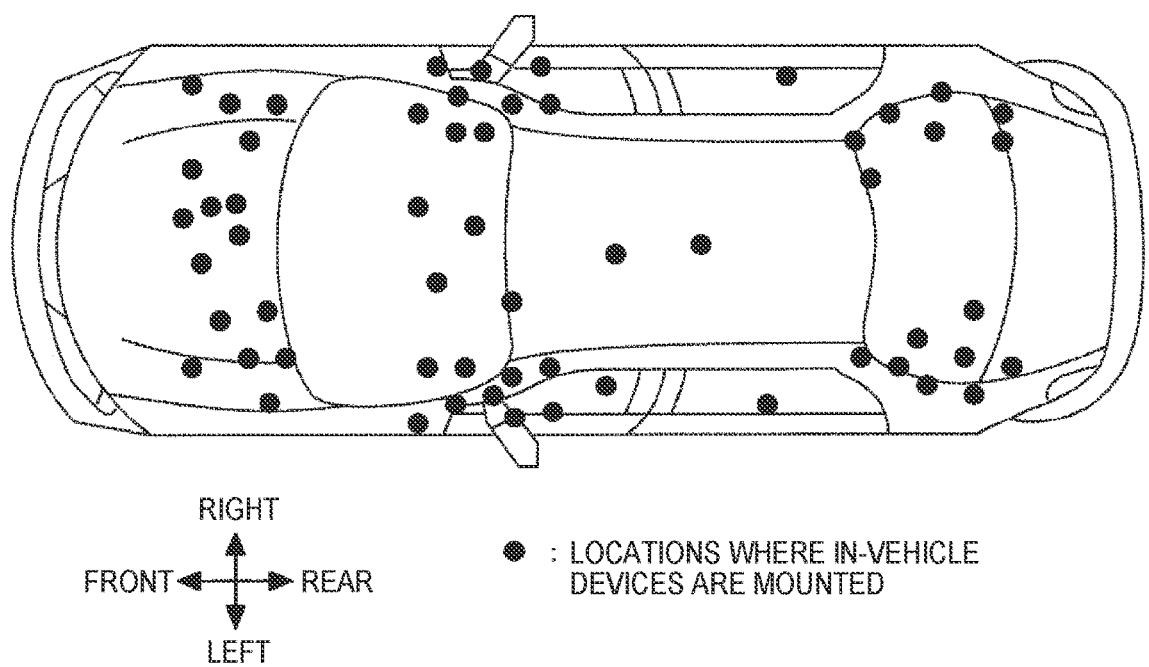
FIG. 6 is a view that shows an example of locations where in-vehicle devices are mounted in a vehicle.

The host power supply branch portion 11 is a box for branching supply power from a power supply placed inside an engine compartment that is a space in the vehicle body at a front part of the vehicle, where an engine is mounted. The host power supply branch portion 11 is connected to the power supply trunk line 21R and the power supply trunk line 21L. The host power supply branch portion 11 is able to receive electric power that is supplied from a power supply device (not shown) via the power supply trunk line 21R or the power supply trunk line 21L or both and supply electric power to in-vehicle devices (not shown) by branching the electric power. The power supply device is able to supply electric power. Examples of the power supply device include an alternator (generator) and a low-voltage battery. The in-vehicle devices are electrical loads, such as electrical components. The host power supply branch portion 11 is desirably provided at a location near in-vehicle devices that receive electric power supplied from the low-voltage battery or the host power supply branch portion 11. The host power supply branch portion 11 is suitably placed in, for example, the engine compartment where the low-voltage battery is disposed and many of the in-vehicle devices are intensively mounted (see FIG. 6). The host power supply branch portion 11 includes connectors for connecting the power supply trunk line 21R and the power supply trunk line 21L, a branch terminal box that branches the trunk line into one or more branch lines, and others. The host power supply branch portion 11 may include a protector, such as a relay and a fuse, appropriate for an in-vehicle device that is connected thereto by a branch line. The host power supply branch portion 11 is electrically connected to the first power supply branch portion 12R via the power supply trunk line 21R and the power supply trunk line 22R connected to the power supply trunk line 21R. The host power supply branch portion 11 is also electrically connected to the third power supply branch portion 12L via the power supply trunk line 21L and the power supply trunk line 22L connected to the power supply trunk line 21L.

The first power supply branch portion 12R provided downstream of the host power supply branch portion 11 is a box for branching supply power from a power supply placed inside an instrument panel in which meters, warning lamps, and others, are disposed. The first power supply branch portion 12R is disposed at the front part of the vehicle at a right-side part of the vehicle in the vehicle width direction with respect to a center line A extending in the vehicle front and rear direction through the center of the vehicle (vehicle front right part). The first power supply branch portion 12R is electrically connected to the host power supply branch portion 11 via the power supply trunk lines 21R, 22R. The first power supply branch portion 12R is able to branch and supply electric power, which is supplied from the power supply device (not shown) via the power supply trunk lines 21R, 22R, to in-vehicle devices (not shown) that are electrical loads, such as electrical components, with the electric power. The first power supply branch portion 12R is desirably provided at a location near in-vehicle devices that receive electric power supplied via the first power supply branch portion 12R and is desirably placed, for example, near a right cowl side of the vehicle where many of the in-vehicle devices are intensively mounted (see FIG. 6). The first power supply branch portion 12R is electrically connected to the second power supply branch portion 13R via the power supply trunk line 23R. The first power supply branch portion 12R supplies electric power, which is received from the above-described power supply device, to the second power supply branch portion 13R via the power supply trunk line 23R. The first power supply branch portion 12R includes connectors for connecting the power supply trunk line 22R and the power supply trunk line 23R, a branch terminal box that branches the trunk line into one or more branch lines, and others. The first power supply branch portion 12R may include a protector, such as a relay and a fuse, appropriate for an in-vehicle device that is connected thereto by a branch line.

The second power supply branch portion 13R provided downstream of the first power supply branch portion 12R is a box for branching supply power from a power supply placed inside a luggage compartment that is a space formed at a rear part of the vehicle to mainly load luggage. The second power supply branch portion 13R is disposed at the rear part of the vehicle at the right-side part in the vehicle width direction with respect to the center line A extending in the vehicle front and rear direction through the center of the vehicle (vehicle rear right part). The second power supply branch portion 13R is electrically connected to the first power supply branch portion 12R via the power supply trunk line 23R. The second power supply branch portion 13R is able to branch and supply electric power, which is supplied from the above-described power supply device (not shown) via the first power supply branch portion 12R and the power supply trunk line 23R, to in-vehicle devices (not shown) that are electrical loads, such as electrical components. The second power supply branch portion 13R is desirably provided at a location near in-vehicle devices that receive electric power supplied via the second power supply branch portion 13R and is desirably placed, for example, above a right rear wheel house of the vehicle where many of the in-vehicle devices are intensively mounted (see FIG. 6).

The third power supply branch portion 12L provided downstream of the host power supply branch portion 11 is a box for branching supply power from the power supply placed inside the instrument panel in which the meters, the warning lamps, and others, are disposed. The third power supply branch portion 12L is disposed at the front part of the vehicle at a left-side part of the vehicle in the vehicle width direction with respect to the center line A extending in the vehicle front and rear direction through the center of the vehicle (vehicle front left part). The third power supply branch portion 12L is electrically connected to the host power supply branch portion 11 via the power supply trunk lines 21L, 22L. The third power supply branch portion 12L is able to supply electric power, which is supplied from the power supply device (not shown) via the power supply trunk lines 21L, 22L, to in-vehicle devices (not shown) that are electrical loads, such as electrical components. The third power supply branch portion 12L is desirably provided at a location near in-vehicle devices that receive electric power supplied via the third power supply branch portion 12L and is desirably placed, for example, near a left cowl side of the vehicle where many of the in-vehicle devices are intensively mounted (see FIG. 6). The third power supply branch portion 12L is electrically connected to the fourth power supply branch portion 13L via the power supply trunk line 23L. The third power supply branch portion 12L supplies electric power, which is received from the above-described power supply device, to the fourth power supply branch portion 13L via the power supply trunk line 23L. The third power supply branch portion 12L includes connectors for connecting the power supply trunk line 22L and the power supply trunk line 23L, a branch terminal box that branches the trunk line into one or more branch lines, and others. The third power supply branch portion 12L may include a protector, such as a relay and a fuse, appropriate for an in-vehicle device that is connected thereto by a branch line.

The fourth power supply branch portion 13L provided downstream of the third power supply branch portion 12L is a box for branching supply power from the power supply placed inside the luggage compartment that is the space formed at the rear part of the vehicle to mainly load luggage. The fourth power supply branch portion 13L is disposed at the rear part of the vehicle at the left-side part in the vehicle width direction with respect to the center line A extending in the vehicle front and rear direction through the center of the vehicle (vehicle rear left part). The fourth power supply branch portion 13L is electrically connected to the third power supply branch portion 12L via the power supply trunk line 23L. The fourth power supply branch portion 13L is able to branch and supply electric power, which is supplied from the above-described power supply device (not shown) via the third power supply branch portion 12L and the power supply trunk line 23L, to in-vehicle devices (not shown) that are electrical loads, such as electrical components. The fourth power supply branch portion 13L is desirably provided at a location near in-vehicle devices that receive electric power supplied via the fourth power supply branch portion 13L and is desirably placed, for example, above a left rear wheel house of the vehicle where many of the in-vehicle devices are intensively mounted (see FIG. 6).

The sizes or shapes of the first to fourth power supply branch portions may be the same or may be different from one another. The size or shape of each power supply branch portion may be changed as needed based on the number of in-vehicle devices connected to the corresponding power supply branch portion, the sum of electric power consumed by the connected in-vehicle devices, or other factors.

The power supply trunk lines 21R, 21L, 22R, 22L, 23R, 23L are power supply lines that connect the power supply branch portions to supply electric power from the power supply device to various in-vehicle devices (such as electronic control units and actuators) mounted on the vehicle. The power supply trunk line 21R extending in the width direction at the front part of the vehicle and the power supply trunk line 22R extending in the front and rear direction at the right-side part of the vehicle are continuous and connect the host power supply branch portion 11 and the first power supply branch portion 12R. The power supply trunk line 21L extending in the width direction at the front part of the vehicle and the power supply trunk line 22L extending in the front and rear direction at the left-side part of the vehicle are continuous and connect the host power supply branch portion 11 and the third power supply branch portion 12L. The power supply trunk line 21R and the power supply trunk line 21L are connected at the host power supply branch portion 11. The power supply trunk line 23R extending in the front and rear direction at the right-side part of the vehicle connects the first power supply branch portion 12R and the second power supply branch portion 13R. The power supply trunk line 23L extending in the front and rear direction at the left-side part of the vehicle connects the third power supply branch portion 12L and the fourth power supply branch portion 13L. Thus, the power supply trunk line routing structure 100 of the present embodiment is such a structure that the power supply trunk line 21R and the power supply trunk line 21L connect the power supply trunk lines 22R, 23R extending in the vehicle front and rear direction along the right-side part in the vehicle width direction and the power supply trunk lines 22L, 23L extending in the vehicle front and rear direction along the left-side part in the vehicle width direction at the front part of the vehicle. The power supply device is connected to one or both of the power supply trunk line 21R and the power supply trunk line 21L.

The power supply trunk lines 21R, 21L, 22R, 22L, 23R, 23L may be made from a strand bound together by twisting a plurality of wires, or may be made from a flat strip-shaped flat wiring material using an electrically conductive steel material, such as iron, copper, and aluminum, or may be made from a combination of a strand and a flat wiring material. When the power supply trunk lines are made from a strand, the power supply trunk lines can be flexibly routed, so it is advantageous in high design flexibility. When the power supply trunk lines are made from a flat wiring material, a plurality of wires need not be used, so wiring cost is reduced. In addition, the shape is more easily fixed, so it is advantageous in improved ease of assembly to the vehicle. When the power supply trunk lines are made from a combination of a strand and a flat wiring material, both ends of each power supply trunk line, which need to be connected to the power supply branch portions, are made from a strand and portions between the strands are made from a flat wiring material. Thus, both the above-described advantages are effectively obtained. More specifically, when the power supply trunk lines are attached to the vehicle body to lie along portions that require folding or bending along the shape of the vehicle body, for example, near the cowl sides or the rear wheel houses, routing fitted to the shapes of the cowl sides or rear wheel houses is possible by using flexible wires (strands). A flat routing material extending in a straight line and having high ease of assembly can be used at portions that do not particularly require folding or bending along the shape of the vehicle body, for example, portions where wiring in a straight path is possible.

The power supply trunk lines 21R, 21L, 22R, 22L, 23R, 23L each may be routed in the vehicle solely or may be routed in the vehicle together with a communication line or another line. The power supply trunk lines 22R, 23R may be routed along a right rocker (not shown) that is part of the frame of the vehicle body and that extends in the front and rear direction of the vehicle at the right-side part of the vehicle body. The power supply trunk lines 22L, 23L may be routed along a left rocker (not shown) that is part of the frame of the vehicle body and that extends in the front and rear direction of the vehicle at the left-side part of the vehicle body. In this way, in the case of the structure that two-line power supply trunk lines are respectively routed along the right and left rockers, a redundant power supply structure may be provided as follows. One of the power supply trunk lines (for example, the host power supply branch portion 11→the power supply trunk lines 21L, 22L→the third power supply branch portion 12L→the power supply trunk line 23L→the fourth power supply branch portion 13L) is a main power supply trunk line, and the other one of the power supply trunk line (for example, the host power supply branch portion 11→the power supply trunk lines 21R, 22R→the first power supply branch portion 12R→the power supply trunk line 23R→the second power supply branch portion 13R) is an auxiliary power supply trunk line. Thus, in the case where an in-vehicle device (such as an autonomous driving system) that desirably has redundant power supply is mounted at the rear part of the vehicle, electric power can be supplied from not only the fourth power supply branch portion 13L but also the second power supply branch portion 13R to the in-vehicle device.

Figure 2:
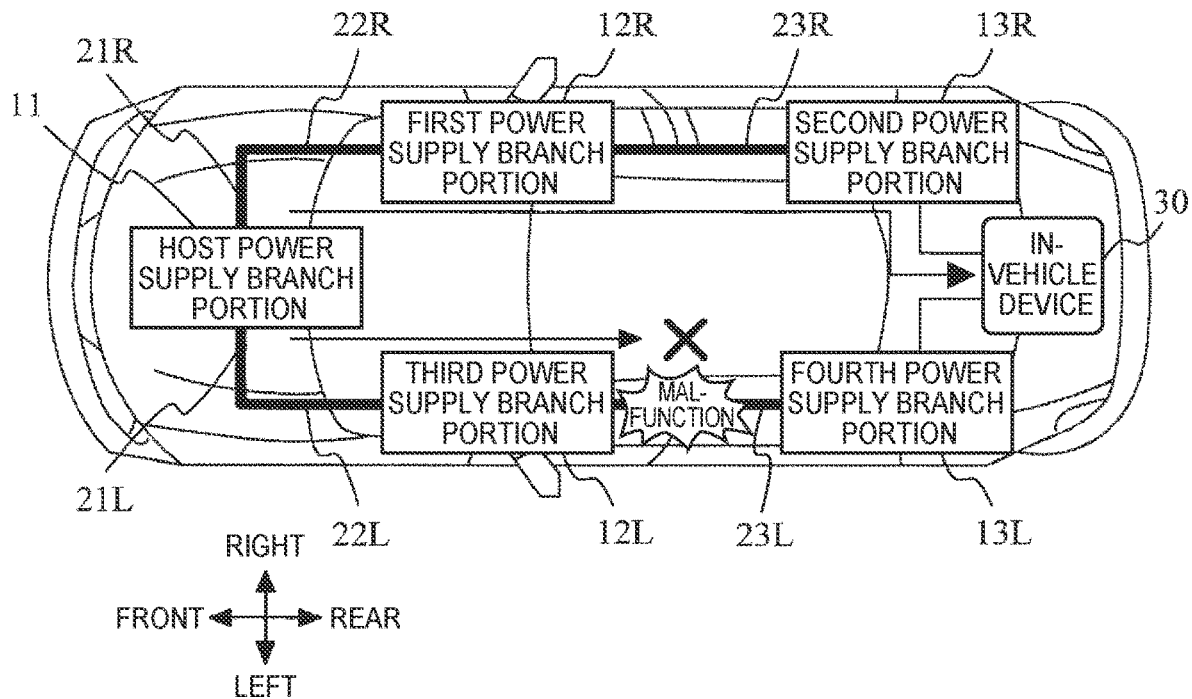
FIG. 2 is a view that illustrates an advantageous effect of the power supply trunk line routing structure according to the embodiment.

With the above redundant power supply structure, even when there occurs a malfunction, such as a break and a short circuit, in the power supply trunk line 23L of the main power supply trunk line for a so-called lateral collision, or the like, that another vehicle collides with a side of the vehicle and, as a result, the power supply path from the third power supply branch portion 12L to the fourth power supply branch portion 13L is interrupted (power supply failure) as shown in, for example, FIG. 2, electric power can be supplied from the second power supply branch portion 13R of the auxiliary power supply trunk line to an in-vehicle device 30. This avoids a situation in which the in-vehicle device 30 disposed in the luggage compartment stops and the corresponding function fails because of occurrence of a malfunction in the power supply trunk line.

The power supply trunk lines 21R, 21L, 22R, 22L, 23R, 23L each may be equal in length, wire diameter (cross-sectional area), or the like, to each other or may be different from each other. The length, wire diameter (cross-sectional area), or the like, of each power supply trunk line can be changed as needed based on the sum of electric power consumed by in-vehicle devices connected thereto on the downstream side of the corresponding power supply trunk line.

Operation and Advantageous Effects

As described above, with the power supply trunk line routing structure 100 according to the present embodiment, the power supply trunk lines are disposed in the vehicle front and rear direction at each of the right-side part and the left-side part in the vehicle width direction, the plurality of power supply branch portions disposed at the right part of the vehicle is connected to the power supply trunk lines extending at the right-side part of the vehicle, and the plurality of power supply branch portions disposed at the left part of the vehicle is connected to the power supply trunk lines extending at the left-side part of the vehicle. With the power supply trunk line routing structure, wire harnesses including the power supply trunk lines can be easily attached or detached from outside the vehicle. With this configuration, a worker need not enter into the vehicle to assemble, check, or replace wire harnesses, so ease of assembly and serviceability of wire harnesses are improved.

With the power supply trunk line routing structure 100 according to the present embodiment, the physically redundant power supply trunk lines are provided by the power supply trunk lines extending at the right-side part in the vehicle width direction and the power supply trunk lines extending at the left-side part in the vehicle width direction. With this configuration, redundant power supplies may be configured for an in-vehicle device placed in the luggage compartment or the like. Therefore, even when there occurs a failure in any one of the right and left power supply trunk lines and supply of electric power from the any one of the right and left power supply trunk lines to the in-vehicle device is stopped, electric power can be supplied to the in-vehicle device via the other one of the power supply trunk lines, so the function of the in-vehicle device is prevented from being stopped.

With the power supply trunk line routing structure 100 according to the present embodiment, a flat wiring material is used for the power supply trunk lines. Therefore, power supply lines individually routed to connect a power supply and in-vehicle devices by strands or the like so far can be integrated as one. With this configuration, the weight of ware harnesses (W/H) is reduced.

With the power supply trunk line routing structure 100 according to the present embodiment, the power supply branch portions are disposed at locations near areas in which many in-vehicle devices to be supplied with electric power are intensively mounted. With this configuration, the length of branch lines that branch from the power supply trunk line to the in-vehicle devices at each power supply branch portion is reduced, so the weight of wire harnesses (W/H) is reduced.

First Modification

Figure 3:
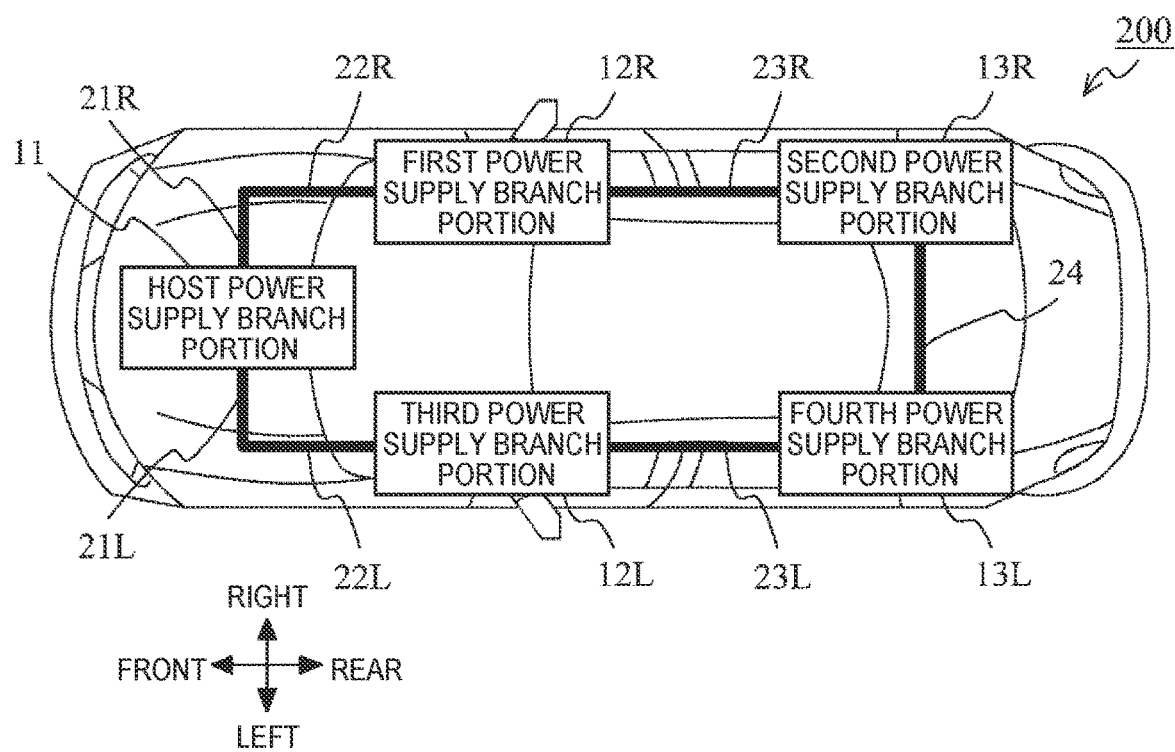
FIG. 3 is a plan view of a vehicle that includes a power supply trunk line routing structure according to a first modification of the embodiment.

FIG. 3 is a plan view of a vehicle that includes a power supply trunk line routing structure 200 according to a first modification of the embodiment of the disclosure when viewed from above with part of a vehicle body, such as a roof, seen through. The power supply trunk line routing structure 200 according to the first modification shown in FIG. 3 is such a structure that a power supply trunk line 24 that connects the second power supply branch portion 13R and the fourth power supply branch portion 13L is further provided in the power supply trunk line routing structure 100 shown in FIG. 1.

The power supply trunk line 24, as well as the power supply trunk lines 21R, 21L, 22R, 22L, 23R, 23L, may be made from a strand bound together by twisting a plurality of wires, or may be made from a flat strip-shaped flat wiring material using an electrically conductive steel material, such as iron, copper, and aluminum, or may be made from a combination of a strand and a flat wiring material. The power supply trunk line 24 may be routed in the vehicle solely or may be routed in the vehicle together with a communication line or another line.

Figure 4:
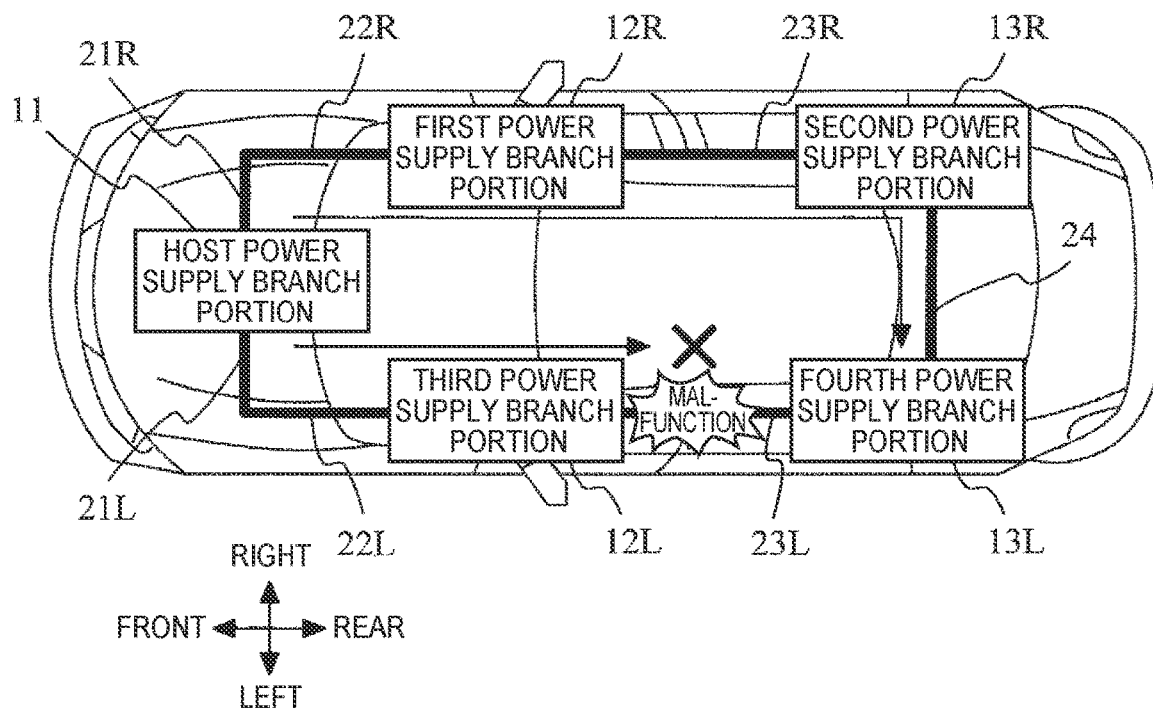
FIG. 4 is a view that illustrates an advantageous effect of the power supply trunk line routing structure according to the first modification of the embodiment.

With the routing structure according to the first modification, even when there occurs a malfunction, such as a break and a short circuit, in the power supply trunk line 23L of the main power supply trunk line and, as a result, the power supply path from the third power supply branch portion 12L to the fourth power supply branch portion 13L is interrupted as shown in, for example, FIG. 4, electric power can be supplied to an in-vehicle device connected to the fourth power supply branch portion 13L through the power supply path, that is, the host power supply branch portion 11→the power supply trunk lines 21R, 22R→the first power supply branch portion 12R→the power supply trunk line 23R→the second power supply branch portion 13R→the power supply trunk line 24→the fourth power supply branch portion 13L. This avoids a situation in which the in-vehicle device connected to the fourth power supply branch portion 13L stops and the corresponding function fails because of occurrence of a malfunction in the power supply trunk line.

Second Modification

Figure 5:
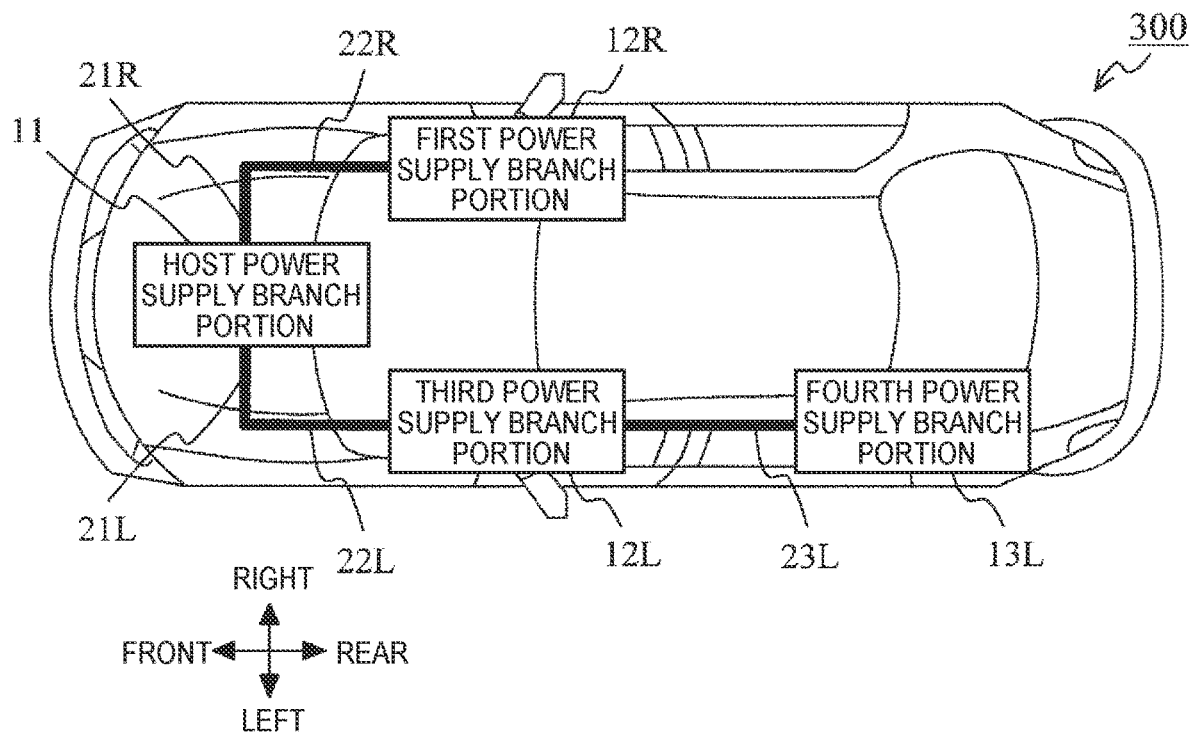
FIG. 5 is a plan view of a vehicle that includes a power supply trunk line routing structure according to a second modification of the embodiment.

FIG. 5 is a plan view of a vehicle that includes a power supply trunk line routing structure 300 according to a second modification of the embodiment of the disclosure when viewed from above with part of a vehicle body, such as a roof, seen through. The power supply trunk line routing structure 300 according to the second modification shown in FIG. 5 is such a structure that the power supply trunk line 23R and the second power supply branch portion 13R are omitted from the power supply trunk line routing structure 100 shown in FIG. 1.

The second modification is an example in which the second power supply branch portion 13R is not provided because, for example, the number of in-vehicle devices disposed at the rear part of the vehicle is small or the sum of electric power consumed by the in-vehicle devices disposed at the rear part of the vehicle is small In the second modification, no physical power supply path from the first power supply branch portion 12R to in-vehicle devices disposed at the rear part of the vehicle is provided, so the second modification is suitable for such a vehicle in which no in-vehicle device that requires power supply redundancy is disposed at the rear part of the vehicle. Of course, when an in-vehicle device that requires power supply redundancy is disposed between the first power supply branch portion 12R and the third power supply branch portion 12L, a redundant power supply may be configured for this in-vehicle device.

In this way, while the power supply trunk line extending in the vehicle front and rear direction is disposed at each of the right-side part and left-side part in the vehicle width direction, the power supply trunk line routing structure can be freely designed according to the number, locations, consumed electric power, and other factors, of in-vehicle devices mounted on the vehicle.

Reference Example

In the above-described embodiment, on the assumption that the low-voltage battery that supplies low voltage to the in-vehicle devices provided at various locations of the vehicle is mounted inside the engine compartment, the power supply trunk line routing structure that the host power supply branch portion 11 is placed inside the engine compartment at the front part of the vehicle, where the engine is mounted, is illustrated. However, for example, in a vehicle in which the above-described low-voltage battery is mounted at the rear part of the vehicle, the host power supply branch portion 11 may be disposed at the rear part of the vehicle. In this case, the power supply trunk lines 22R, 23R, 22L, 23L respectively extending at the right-side part and left-side part in the vehicle width direction just need to be connected at the rear part of the vehicle. The power supply trunk line routing structure is also applicable to a vehicle in which an engine is mounted at the rear part of the vehicle or a vehicle in which not only an engine but also a motor is mounted.

The disclosure can be interpreted as not only a power supply trunk line routing structure but also a vehicle on which a power supply trunk line routing structure is mounted.

The power supply trunk line routing structure of the aspect of the disclosure is usable in vehicles, such as automobiles, and is useful, for example, when ease of assembly and serviceability of wire harnesses are intended to be improved.

What is claimed is:

1. A power supply trunk line routing structure for a vehicle, the power supply trunk line routing structure comprising:
   a first power supply trunk line attached to and extending along one or more rockers of a vehicle body of the vehicle from a front end portion to a rear end portion of the vehicle in a vehicle front and rear direction along a right-side part of the vehicle in a vehicle width direction;

a second power supply trunk line attached to and extending along one or more rockers of the vehicle body of the vehicle from the front end portion to the rear end portion of the vehicle in the vehicle front and rear direction along a left-side part of the vehicle in the vehicle width direction; and a third power supply trunk line connected to a predetermined power supply device, the third power supply trunk line connecting the first power supply trunk line and the second power supply trunk line in the front end portion of the vehicle, both of the first power supply trunk line and the second power supply trunk line being connected to a same in-vehicle device located in the rear end portion of the vehicle, the predetermined power supply device simultaneously supplying power through both the first power supply trunk line and the second power supply trunk line to the in-vehicle device, wherein in response to a malfunction disconnecting the supply of power through one of the first power supply line and the second power supply line, the supply of power continues to be provided to the in-vehicle device through another one of the first power supply line and the second power supply line, wherein each of the first power supply trunk line, second power supply trunk line, and third power supply trunk line is formed of a plurality of wires wound together to form a strand.

2. The power supply trunk line routing structure according to claim 1, wherein:

the first power supply trunk line connects a first power supply branch portion and a second power supply branch portion, the first power supply branch portion being disposed at a right part of the front end portion of the vehicle at the right-side part in the vehicle width direction with respect to a center line extending in the vehicle front and rear direction through a center of the vehicle, and the second power supply branch portion is disposed at a right part of the rear end portion of the vehicle at the right-side part in the vehicle width direction with respect to the center line; and the second power supply trunk line connects a third power supply branch portion and a fourth power supply branch portion, the third power supply branch portion being disposed at a left part of the front end portion of the vehicle at the left-side part in the vehicle width direction with respect to the center line, and the fourth power supply branch portion is disposed at a left part of the rear end portion of the vehicle at the left-side part in the vehicle width direction with respect to the center line.

3. The power supply trunk line routing structure according to claim 2, wherein the second power supply branch portion and the fourth power supply branch portion are connected by a fourth power supply trunk line.

4. The power supply trunk line routing structure according to claim 2, wherein the first power supply branch portion is configured to branch supply power from a power supply placed inside an instrument panel in which a meter or a warning lamp is disposed.

5. The power supply trunk line routing structure according to claim 2, wherein the second power supply branch portion is configured to branch supply power from a power supply placed inside a luggage compartment, which is a space formed at the rear part of the vehicle to load luggage.

6. The power supply trunk line routing structure according to claim 2, wherein the third power supply branch portion is configured to branch supply power from a power supply placed inside an instrument panel in which a meter or a warning lamp is disposed.

7. The power supply trunk line routing structure according to claim 2, wherein the fourth power supply branch portion is configured to branch supply power from a power supply placed inside a luggage compartment, which is a space formed at the rear part of the vehicle to load luggage.

8. The power supply trunk line routing structure according to claim 1, wherein each of the first power supply trunk line and the second power supply trunk line includes a flat strip-shaped flat wiring material extending in a straight line and using a steel material at least partially having an electrically conductive property.

9. The power supply trunk line routing structure according to claim 8, wherein:

each of the first power supply trunk line and the second power supply trunk line includes a flexible wire; and each flexible wire is attachable to a vehicle body when bent along a shape of the vehicle body.

10. A vehicle comprising the power supply trunk line routing structure according to claim 1.

* * * * *